(12) United States Patent
Jackson

(10) Patent No.: US 7,913,581 B2
(45) Date of Patent: *Mar. 29, 2011

(54) DUAL CLUTCH TRANSMISSION WITH MULTIPLE RANGE GEARING

(75) Inventor: Graeme A. Jackson, Kalamazoo, MI (US)

(73) Assignee: Eaton Corporation, Cleveland, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 12/575,807

(22) Filed: Oct. 8, 2009

(65) Prior Publication Data

US 2010/0029432 A1 Feb. 4, 2010

Related U.S. Application Data

(63) Continuation of application No. 11/702,361, filed on Feb. 5, 2007, now Pat. No. 7,621,839.

(51) Int. Cl.
 *F16H 3/08* (2006.01)
 *F16H 37/02* (2006.01)
(52) U.S. Cl. ............ 74/330; 74/331; 475/214; 475/215; 475/218
(58) Field of Classification Search .............. 475/218, 475/214, 215, 302; 74/330, 331
See application file for complete search history.

(56) References Cited

U.S. PATENT DOCUMENTS

| | | | |
|---|---|---|---|
| 2,379,023 A | 6/1945 | Miller | |
| 2,697,368 A * | 12/1954 | Winther et al. | 475/279 |
| 3,302,475 A * | 2/1967 | Elfes et al. | 74/368 |
| 3,362,245 A | 1/1968 | Francuch et al. | |
| 4,296,644 A | 10/1981 | Sada et al. | |
| 4,966,048 A | 10/1990 | Braun | |
| 5,511,437 A * | 4/1996 | Braun | 74/331 |
| 6,397,994 B1 | 6/2002 | Bowen | |
| 6,958,028 B2 * | 10/2005 | Janson et al. | 475/207 |
| 7,204,166 B2 | 4/2007 | Gochenour | |
| 7,587,957 B2 | 9/2009 | Jackson | |
| 2006/0096414 A1 | 5/2006 | Gochenour | |
| 2007/0220999 A1 | 9/2007 | Hatori et al. | |
| 2008/0034905 A1* | 2/2008 | Hatori et al. | 74/330 |
| 2009/0266199 A1 | 10/2009 | Jackson | |

FOREIGN PATENT DOCUMENTS

DE 10260179 7/2004
GB 2412148 9/2005

OTHER PUBLICATIONS

International Search Report for PCT/IB2008/000244 dated May 27, 2008.

* cited by examiner

Primary Examiner — Tisha D Lewis
(74) Attorney, Agent, or Firm — Brooks Kushman P.C.

(57) ABSTRACT

A vehicle powertrain comprising dual torque input clutches and a multiple speed transmission with ratio range gearing is disclosed. The range gearing provides increased gear ratio coverage. A transition between a low speed ratio range and a high speed ratio range is achieved with no torque interruption. A shift from one gear ratio to an adjacent gear ratio in a speed ratio range during a shift sequence is preceded by preselecting the adjacent gear ratio.

6 Claims, 17 Drawing Sheets

DUAL CLUTCH TRANSMISSION WITH MULTIPLE RANGE GEARING

CROSS-REFERENCE TO RELATED APPLICATIONS

This application is a continuation of U.S. application Ser. No. 11/702,361 filed Feb. 5, 2007, now U.S. Pat. No. 7,621,839. Applicant claims the benefit of that patent application.

BACKGROUND OF THE INVENTION

1. Field of the Invention

The invention relates to geared, multiple-ratio power transmission mechanisms having dual clutches to permit selective engagement and disengagement of ratio change clutches for operation in a given ratio while preselecting ratio change clutches for an adjacent ratio during a shift sequence in separate speed ratio ranges.

2. Background Art

Conventional automotive vehicle powertrains typically have multiple-ratio transmission mechanisms that establish power delivery paths from an engine to vehicle traction wheels. Adequate powertrain performance for heavy-duty or medium-duty powertrains requires more than one range of gear ratios so that the speed and torque characteristic of the engine will provide optimum traction wheel power throughout the operating speed range for the vehicle. Ratio range gearing, therefore, typically is used with a transmission mechanism in such high torque capacity powertrains so that sufficient overall gear ratio coverage is provided. The overall gear ratio coverage will be equal to the product of the number of gear ratios for the transmission and the number of gear ratios in the ratio range gearing.

One class of transmission mechanisms in automotive vehicle powertrains includes countershaft gearing having power delivery gears journaled on a transmission mainshaft and countershaft gear elements journaled on a countershaft arranged in spaced, parallel disposition with respect to the mainshaft. The countershaft gear elements typically mesh with the gears mounted on a mainshaft axis. Operator-controlled clutches, which may be either positive drive dog clutches or synchronizer clutches, selectively connect torque transmitting gears on the mainshaft axis to the mainshaft, thereby establishing a power delivery path from the engine to the traction wheels. In other countershaft transmission mechanisms, the dog clutches or the synchronizer clutches may be mounted on the countershaft axis to selectively engage countershaft gear elements with torque transmitting gears on the mainshaft.

It is known design practice to use a dual clutch arrangement for selectively connecting the engine to first and second torque input gears, sometimes called headset gears, of a countershaft transmission mechanism. An example of a dual clutch countershaft transmission mechanism of this type may be seen by referring to U.S. patent application Ser. No. 10/983,531, filed Nov. 8, 2004, entitled "Dual Clutch Assembly For A Heavy-Duty Automotive Powertrain." That application is assigned to the assignee of the present invention.

A dual clutch arrangement makes it possible for a countershaft transmission mechanism to be power-shifted from one ratio to another. As one of the dual clutches is engaged, the other is disengaged. The engaged clutch will establish a power delivery path through the countershaft gear elements and through the main transmission gears as one or more of the ratio change clutches are engaged. A ratio change clutch for a main transmission gear, or a countershaft gear element that is not involved in a given selected power flow path, can be pre-engaged in preparation for a ratio change to an adjacent ratio. When a ratio change is initiated, the ratio change clutch for one main gear or for one countershaft gear element is disengaged, and a power flow path is established by the pre-engaged ratio change clutch for a second main gear or a second countershaft gear element. The dual clutches of the dual clutch arrangement are alternately engaged and disengaged ("swapped" or "traded") thereby providing a smooth transition from one ratio to an adjacent ratio in a seamless fashion.

If a multiple gear ratio power transmission mechanism of the type previously described is intended for use in a powertrain for a medium-duty or heavy-duty vehicle or truck, an increased number of gear ratios is required throughout the engine speed range. Typically, an increased number of gear ratios is achieved by combining a two-speed range gearing arrangement at a torque output portion of the multiple gear ratio transmission. Although a two-speed range gearing arrangement is typical, a range gearing arrangement adapted for an increased number of ratios can be used if a particular application for the vehicle requires broader ratio coverage. A two-speed range gearing arrangement will double the number of gear ratios available in the powertrain. If a multiple ratio transmission mechanism has dual clutches, it can be power-shifted between ratios without torque interruption between the engine and the vehicle traction wheels.

If the powertrain includes multiple speed range gearing in a torque flow path from the multiple ratio transmission mechanism to the vehicle traction wheels, it is necessary with known heavy-duty or medium-duty powertrains for the torque flow path to be interrupted during a transition from one range to the other. That torque interruption may deteriorate the shift quality because of inertia forces that are created. Further, the time needed to execute a ratio change in the range gearing increases the time needed to execute a shift between the highest overall ratio for one range to the adjacent lowest overall ratio for another range.

An example of a multiple range gearing arrangement with an eight-speed transmission is described in a publication entitled "Automotive Handbook," Third Edition, published by Bosch in 1993, page 544. The overall number of gear ratios in the transmission described in the Handbook is sixteen, which is twice the number of ratios available in the transmission gearing.

SUMMARY OF THE INVENTION

The invention comprises a multiple-speed transmission mechanism with dual clutches that selectively connect an engine in a vehicle powertrain to separate torque input elements of multiple ratio transmission gearing. A multiple-range gearing arrangement is compounded with the gears of multiple-ratio transmission gearing so that a transition may be made from a first range to a second range without torque interruption in the torque flow path between the engine and the traction wheels. In the case of a two-speed range gearing arrangement, the first speed range would be a so-called low range and the second speed range would be a so-called high range.

In accordance with a first embodiment of the invention, a first selectively engageable clutch in the range gearing arrangement selectively connects two elements of the planetary gearing together to establish one ratio in the range gearing arrangement, and selectively connects an element of the range gearing arrangement to the transmission housing to establish a reaction point for another ratio in the range gearing arrangement. A second clutch in the range gearing arrangement is used to selectively connect an element of the multiple ratio transmission mechanism to one element of the planetary gearing and to connect another element of the multiple ratio transmission mechanism to another element of the planetary gearing as a transition is made between the low range and the high range in the range gearing arrangement.

In accordance with a second embodiment of the invention, a countershaft gear assembly can be used rather than planetary gearing in the range gearing arrangement. The invention is not limited in its scope, however, to a range gearing arrangement with a planetary gear or with a countershaft gear assembly since other multiple ratio gearing could be used, depending upon the application for which the powertrain is designed.

In each of the disclosed embodiments of the invention, the dual clutches between the torque input elements of the multiple ratio transmission and the engine can be selectively engaged and disengaged so that each gear ratio in the overall speed ratio range can be preselected as power is transferred through the powertrain with an adjacent overall ratio. This preselection is achieved for all power shifts between ratios regardless of whether the ratio change occurs in a low speed range or a high speed range. Torque interruption is avoided in both embodiments during transitions between the ranges.

PARTICULAR DESCRIPTION OF
EMBODIMENTS OF THE INVENTION

Figure 1:
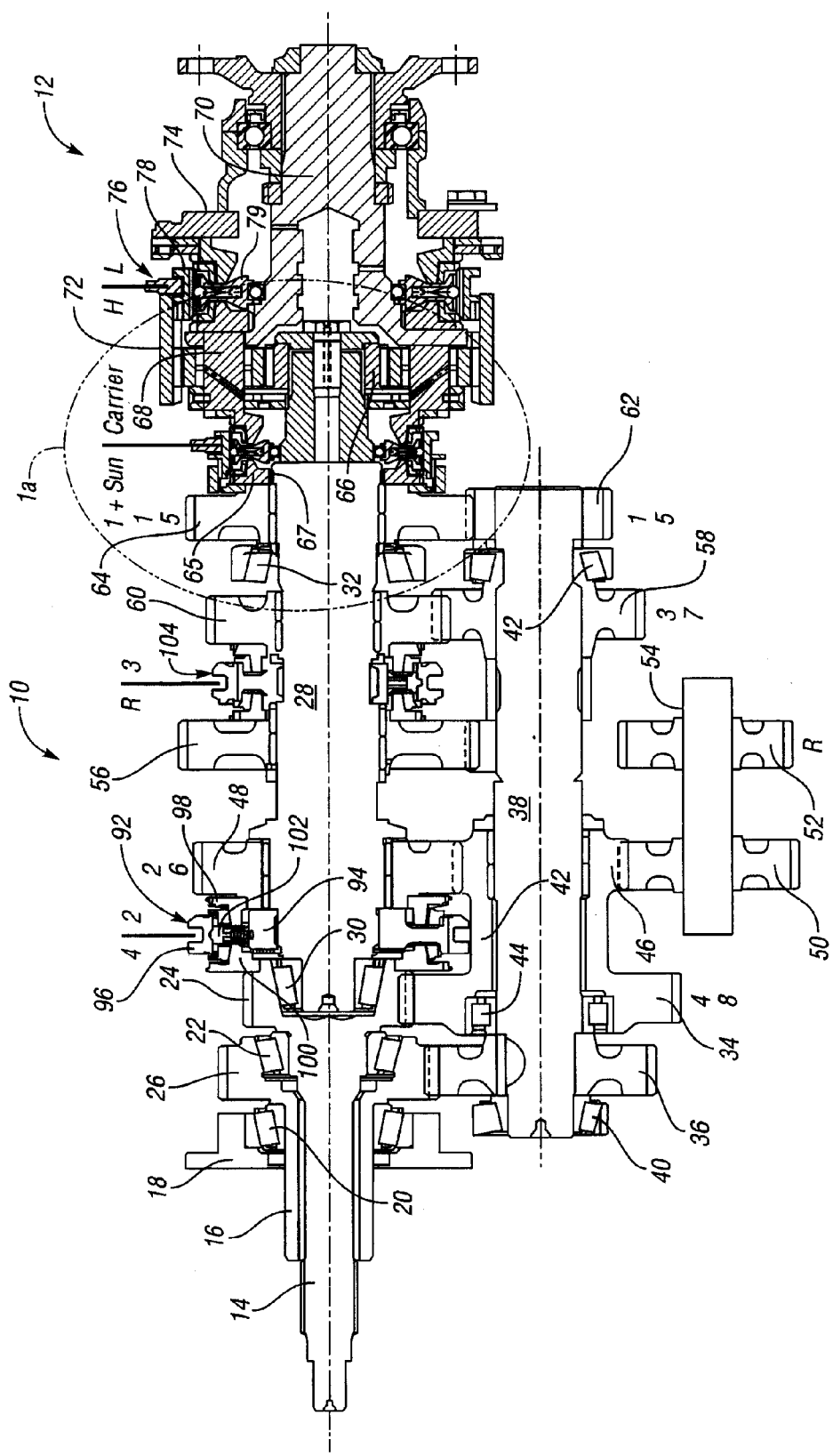
FIG. 1 is a partial cross-sectional view of a powertrain that includes a multiple-speed, dual clutch transmission in combination with two-speed range planetary gearing.

A first embodiment of the invention, which is illustrated in FIG. 1, comprises a multiple-speed, dual clutch transmission, generally indicated at 10, and two-speed range gearing, generally indicated at 12. Transmission 10 has a first torque input shaft 14 and a second torque input shaft 16. Input shaft 16 is a sleeve shaft that surrounds input shaft 14. Sleeve shaft 16 is journaled in a bearing cap in a transmission housing, as partly shown at 18, by tapered roller bearing 20. Shaft 14 is journaled within sleeve shaft 16 by tapered roller bearing 22.

Shaft 14 is connected to a first transmission torque input gear 24 and sleeve shaft 16 is connected to second transmission torque input gear 26.

A transmission mainshaft 28 is aligned with the torque input shafts and is journaled at 30 within a bearing opening in torque input gear 24. The right-hand end of mainshaft 28 is journaled by bearing 32 in the transmission housing so that the shaft 28 is end supported.

Torque input gears 24 and 26 are commonly referred to as headset gears. Gear 24 meshes with countershaft gear 34, and gear 26 meshes with countershaft gear 36. Gear 34 may have a larger pitch diameter than gear 36, but the relative pitch diameters could be different depending on the gear ratios of the mainshaft gears.

Countershaft gear 36 is keyed or splined to countershaft 38, which is end-supported by tapered roller bearing 40 at its left end and by tapered roller bearing 42 at its right end. Bearings 40 and 42 are situated in bearing openings formed in the transmission housing.

Gear 34 is part of a countershaft sleeve 42 rotatably supported about the axis of countershaft 38 by bearings 44 and 46. Countershaft gear element 46 formed on countershaft sleeve 42 is in engagement with mainshaft gear 48, which is journalled on mainshaft 28.

Reverse drive pinions 50 and 52 are mounted on reverse drive countershaft 54. Pinion 52 is in driving engagement with mainshaft gear 56, which is journaled on mainshaft 28. Countershaft gear element 58 is splined or otherwise drivably connected to countershaft 38. It meshes with mainshaft gear 60. Countershaft gear element 62, which is splined or otherwise drivably connected to countershaft 38, meshes with mainshaft gear 64, which is journaled on mainshaft 28.

The right-hand end of mainshaft 28 is connected drivably to sun gear 66 of the two-speed range gearing 12. A planetary carrier 68 of the two-speed range gearing 12 is connected to or is integral with a power output shaft 70, which is connected drivably through a drive shaft to vehicle traction wheels. Ring gear 72 of the two-speed range gearing 12 engages planet pinions carried by the carrier 68.

Ring gear 72 is selectively connected to the transmission housing portion shown at 74 and to the carrier 68 by a high/low range gearing clutch 76. The clutch 76 may be a synchronizer type clutch, as shown in FIG. 1 and in FIG. 1a. It comprises a shiftable clutch sleeve 78 that engages external clutch teeth on the housing portion 74 when it is shifted in a right-hand direction. When the sleeve 78 is shifted in a left-hand direction, it will drivably engage external clutch teeth formed on the carrier 68. The clutch sleeve 78 is slidably splined to an externally splined clutch hub 79.

The shiftable clutch sleeve 78 is connected to ring gear 72, which can shift upon movement of the synchronizer clutch sleeve 78 relative to planet pinions on carrier 68.

Gear 64, which is journaled on mainshaft 28, has external clutch teeth that continuously drivably engage internal spline teeth on splined sleeve 82'. External clutch teeth on clutch sleeve 82 slidably engage the internal spline teeth on spline sleeve 82'. When clutch sleeve 82 is shifted to the left, internal teeth on clutch sleeve 82 engage external clutch teeth on clutch element 65, which connects gear 64 to mainshaft 28 and to sun gear 66. Clutch element 65 is splined or otherwise connected at 67 to mainshaft 28. When clutch sleeve 82 is shifted to the right, external clutch teeth 86 on carrier 68 are engaged with the internal clutch teeth on clutch sleeve 82, which connects gear 64 to carrier 68. The external clutch teeth on clutch sleeve 82 continuously engage internal spline teeth on splined sleeve 82'.

Torque input gear 24 of the headset gearing and gear 48 are rotatably supported on mainshaft 28 and may be selectively connected to mainshaft 28 by ratio change clutch 92, which comprises a clutch hub 94 that slidably supports an internally splined clutch sleeve 96. When the sleeve 96 is shifted in a right-hand direction, external clutch teeth 98 on the clutch element connected to gear 48 are engaged, thus establishing a driving connection between mainshaft 28 and gear 48. When the sleeve 96 is shifted in a left-hand direction, external teeth on clutch element 100 connected to headset gear 24 are engaged, thus establishing a driving connection between mainshaft 28 and power input shaft 14.

The clutch 92 may be a conventional synchronizer clutch assembly that includes a synchronizer ring between the clutch hub 94 and the clutch teeth 98. A similar synchronizer clutch ring may be located between clutch hub 94 and clutch teeth carried by element 100. A spring loaded synchronizer detent element 102 engages a recess in clutch ring 96 to establish a synchronizer ring force on synchronizer ring 98 or on synchronizer ring 100.

A synchronizer clutch assembly 104, which may be of a design that is similar to the synchronizer clutch 92, has a synchronizer ring that can be shifted into engagement with gear 60 or gear 56, thus establishing a driving connection between either of these gears with the mainshaft 28.

Figure 2:
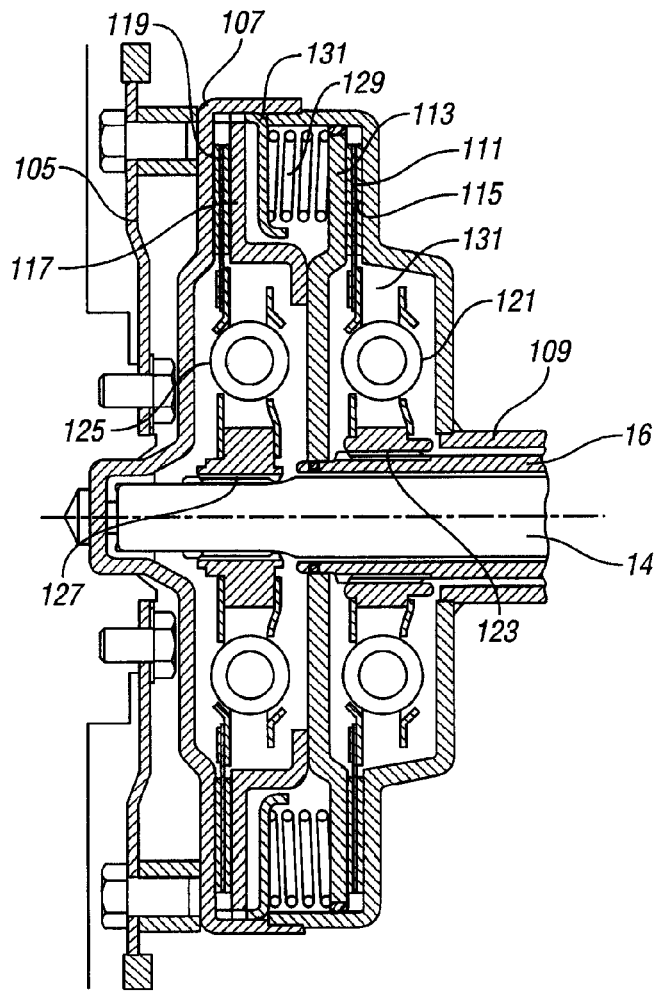
FIG. 2 is a schematic drawing of a dual clutch assembly for use with the transmission of FIG. 1.

A dual clutch assembly that may be used to connect drivably the engine with the two input shafts 14 and 16 is schematically illustrated in FIG. 2. An engine crankshaft is connected through drive plate 105 to clutch housing 107, which has a clutch hub 109 journaled on the transmission housing. A clutch friction disk 111 is situated between a clutch piston 113 and friction surface 115 formed on the clutch housing 107. An axially offset clutch piston portion 117 is situated adjacent friction surface 119 on the clutch housing 107.

Clutch friction disk 111 includes a spring damper assembly 121 with a damper hub that is splined at 123 to power input shaft 16. Similarly, clutch friction disk 119 has a spring damper assembly 125 with a hub that is splined at 127 to power input shaft 14.

Clutch engaging springs 129 are disposed between spring retainer 131 and piston plate 113. Thus, the friction disk 111 normally is engaged under spring pressure to establish a connection between sleeve shaft 16 and the engine crankshaft. The piston portion 117, which is slidably connected at its periphery to the clutch housing 107, is moved out of engagement with friction disk 119, which is connected to shaft 14.

A pressure chamber 131 is defined by the piston plate 114 and the clutch housing. When the chamber 131 is pressurized, friction disk 111 is disengaged as the friction disk 119 for shaft 14 is engaged. The headset gears 26 and 24 thus can be connected selectively to the engine crankshaft by pressurizing and depressurizing the pressure chamber 131.

FIGS. 4, 5, 6 and 7 schematically illustrate driving power flow paths and preselected power flow paths through the multiple-ratio transmission and through the range gearing during operation, respectively, in the first ratio of a low-speed range, second ratio of the low-speed range, third ratio of the low-speed range, and fourth ratio of the low-speed range. In each of these figures, the current power flow path is indicated by a heavy solid line and the preselected power flow path is indicated by a dotted line.

During operation in the first ratio, the clutch for hollow input shaft 16 is engaged. Torque then is distributed from gear 26 to gear element 36 on the countershaft 38. Torque is transferred then through the countershaft 38 and through countershaft gear 62 through the mainshaft gear 64. The clutch sleeve for clutch 84 is shifted to the left so that gear 64 becomes drivably connected to mainshaft 28. The clutch sleeve for range clutch 76 is shifted to the right, thus establishing a mechanical connection between ring gear 72 and the transmission housing. Ring gear 72 thus is anchored to provide an anchor point for the planetary range gearing. The speed of the carrier 68 and the power output shaft 70 then is reduced relative to the speed of the mainshaft 28.

Figure 5:
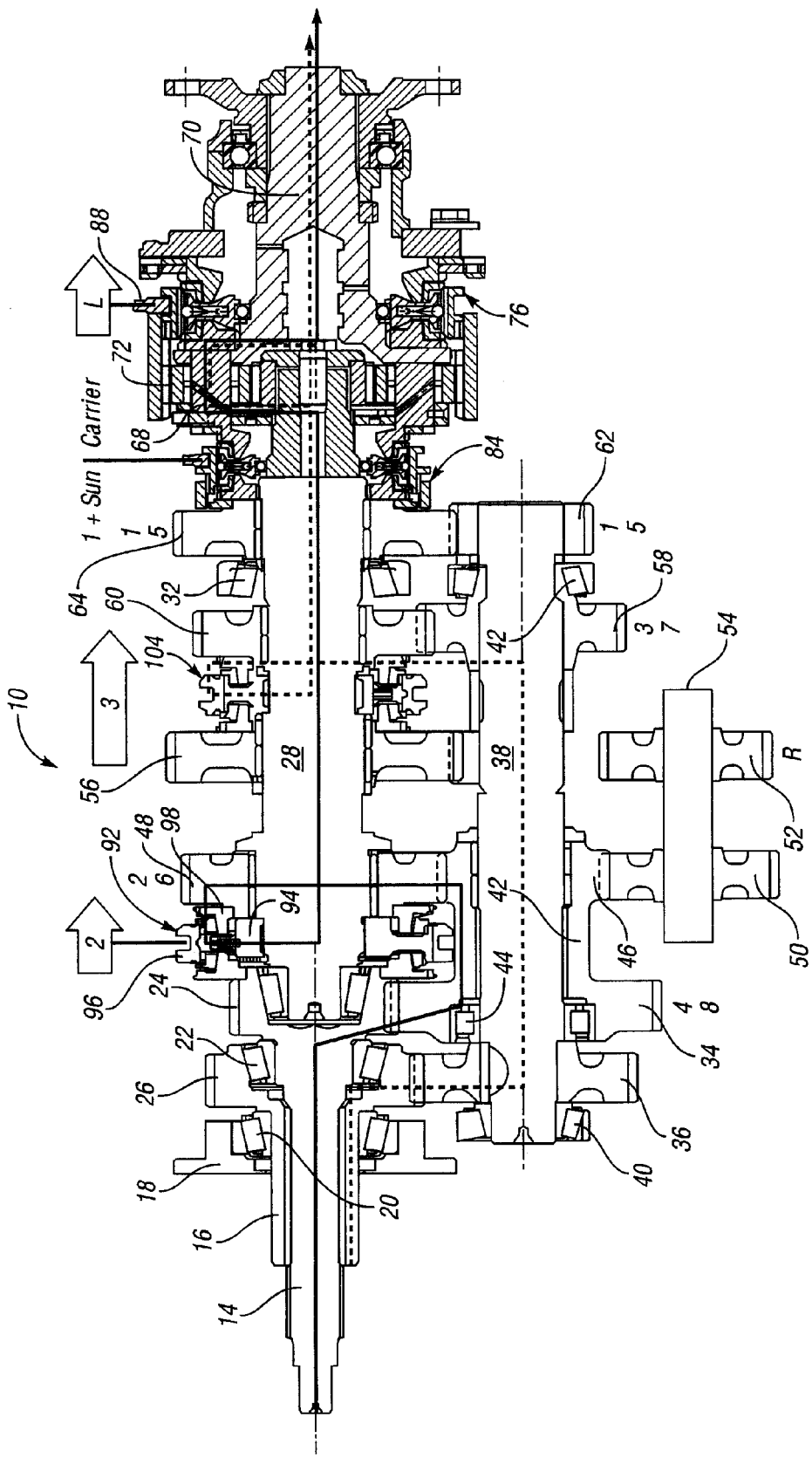
FIG. 5 is an illustration of the power flow path for the transmission illustrated in FIG. 1 during operation in the second ratio in the low range, together with a preselected power flow path for the third ratio.

During operation in the first speed ratio in low range, the second transmission ratio is preselected. This is accomplished by moving the synchronizer clutch sleeve of the synchronizer clutch 92 in a right-hand direction, thus mechanically connecting mainshaft gear 48 to the mainshaft 28. The low range gearing remains unchanged. A transition from the first ratio to the second ratio, which may be considered to be a power shift, then is accomplished by "trading" or "swapping" clutches as the clutch for hollow input shaft 16 is released and the clutch for power input shaft 14 is applied. The power delivery path (dotted line) that was preselected during operation in the first ratio becomes the driving power delivery path during operation in the second ratio. This condition is illustrated in FIG. 5 (solid heavy line) where torque for input shaft 14 is delivered to headset gear 24, which drives countershaft gear 34 and countershaft gear 46. Countershaft gear 46 delivers torque to mainshaft 28 through engaged synchronizer clutch 92, which was preselected as previously indicated. Power then is delivered through the range gearing, as previously described with respect to the first ratio.

During operation in the second driving ratio, the third driving ratio is preselected. This is done by shifting the synchronizer clutch sleeve for synchronizer clutch 104 in a right-hand direction. This locks the gear 60 to the mainshaft 28. Clutch sleeve 82 of the clutch 84 is in a neutral position during operation in the second and third driving ratios. It does not engage either the clutch teeth 86 or the clutch teeth on clutch element 65.

Figure 6:
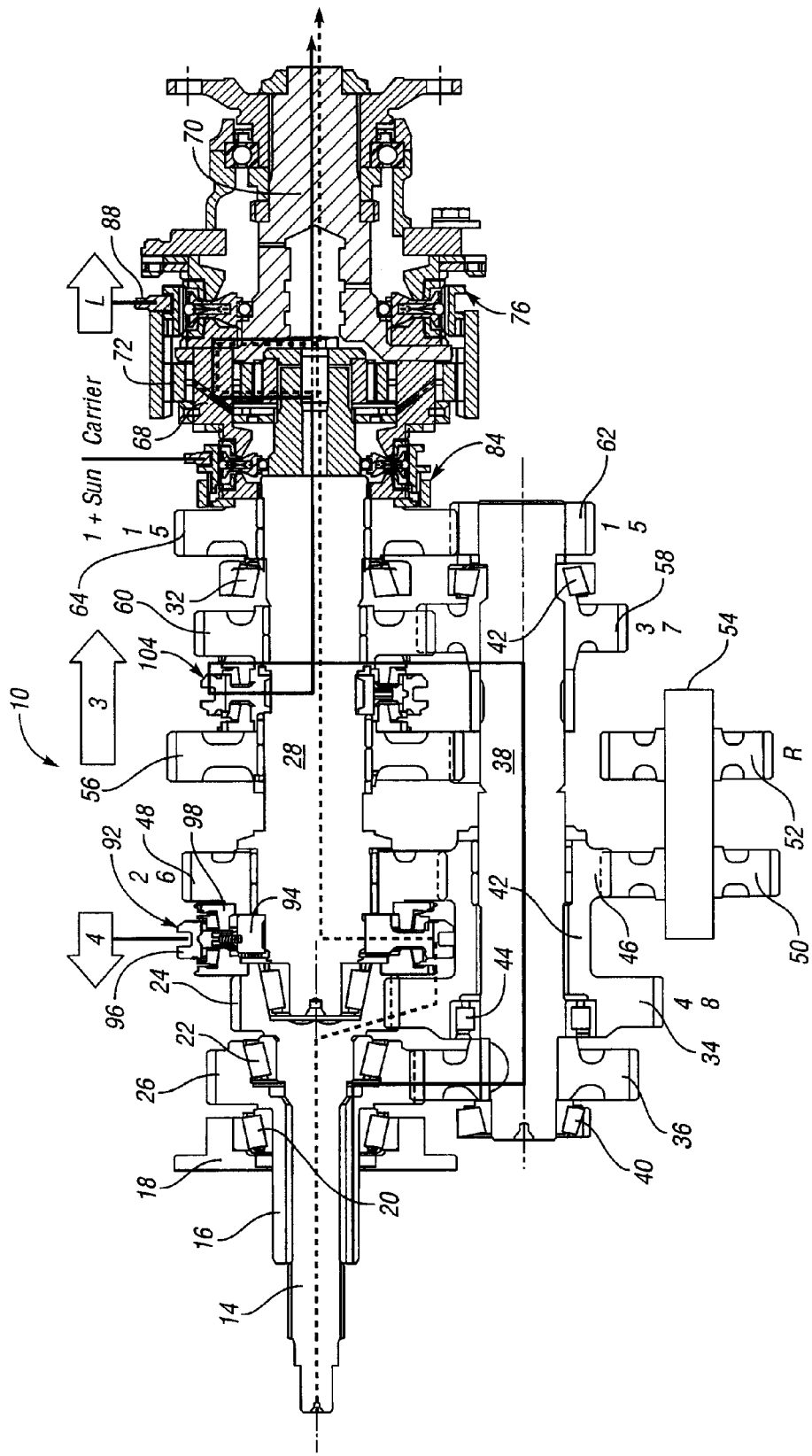
FIG. 6 is an illustration of a power flow path for the transmission of FIG. 1 during operation in the third ratio in the low range, together with a preselected power flow path for the fourth ratio.

A shift from the second transmission ratio to the third transmission ratio, as seen in FIG. 6, then is achieved by trading clutches so that the clutch for hollow input shaft 16 is engaged and the clutch for the shaft 14 is disengaged. Engine power thus is delivered to headset gear 26, which drives countershaft gear element 36 and countershaft 38. Torque then is transferred from countershaft gear element 58 to mainshaft gear 60. Synchronizer clutch 104, which was preengaged during operation in the second ratio, connects drivably gear 60 to the mainshaft 28. The range gearing remains unchanged.

Figure 7:
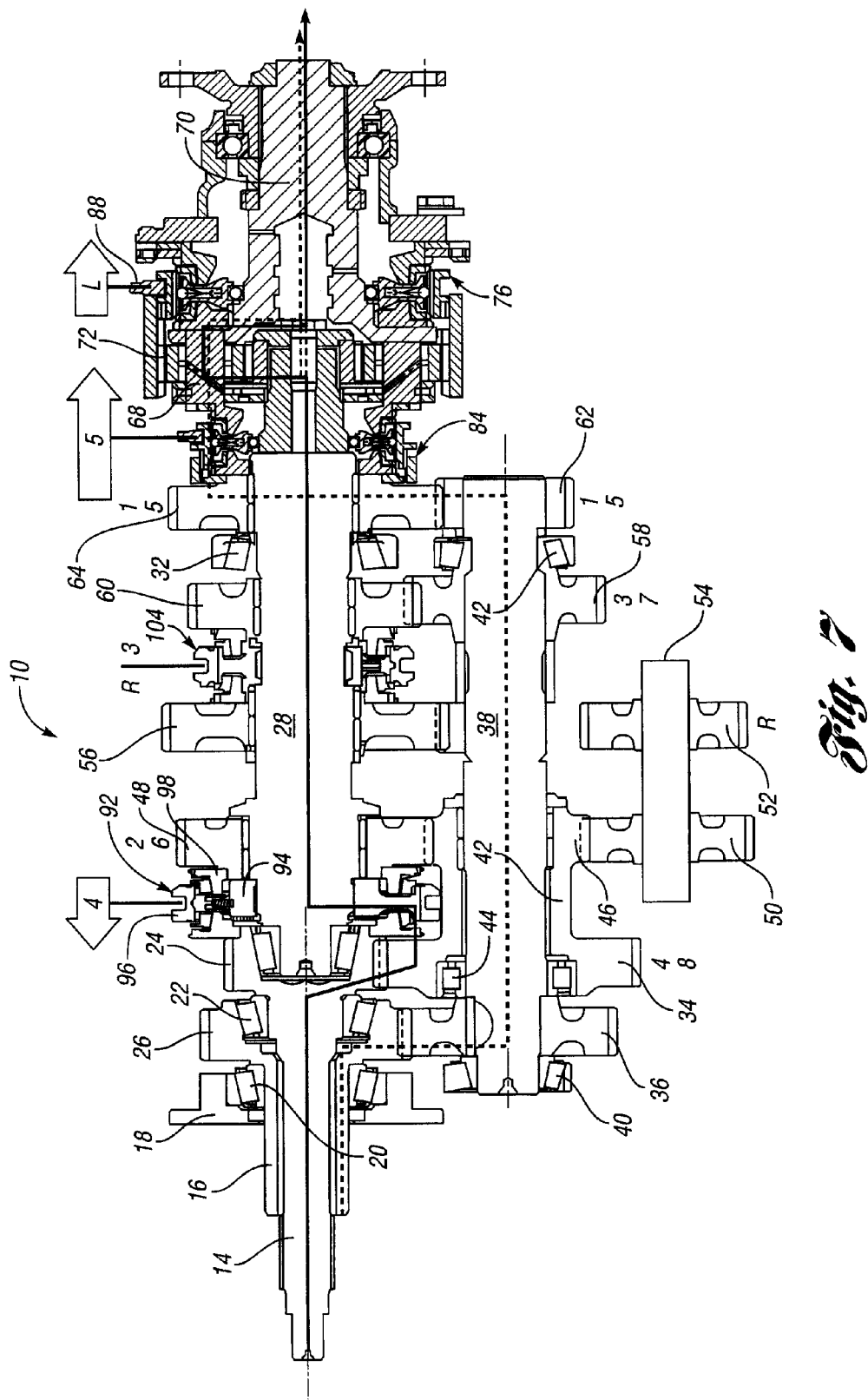
FIG. 7 is an illustration of the power flow path for the transmission of FIG. 1 during operation in the fourth ratio in the low range, together with a preselected power flow path for the fifth ratio.
Figure 8:
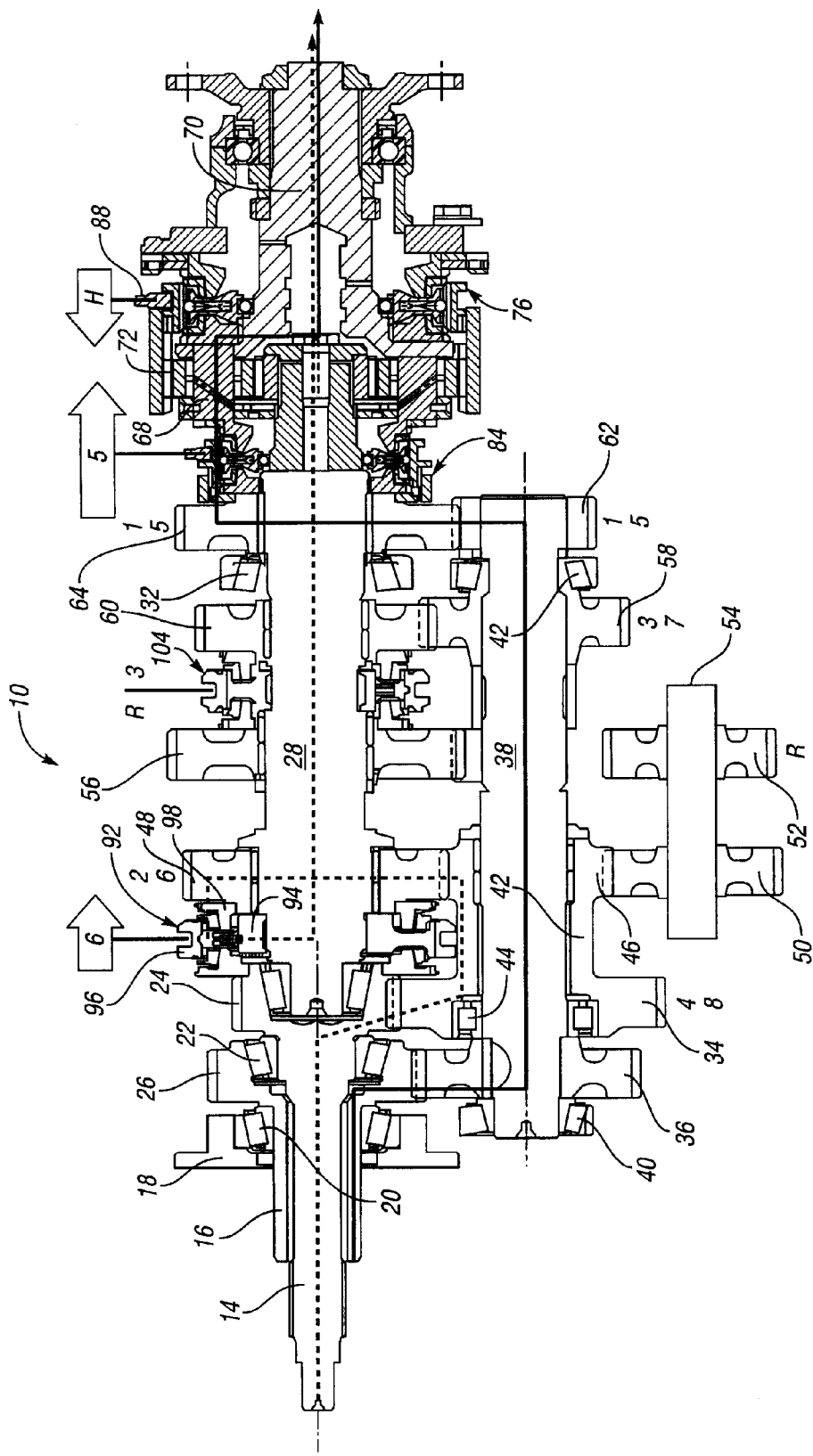
FIG. 8 is an illustration of the power flow path for the transmission of FIG. 1 during operation in the fifth ratio in the high range, together with a preselected power flow path for the sixth ratio.

A shift from the third transmission ratio to the fourth transmission ratio, as seen in FIG. 7, results in a power flow path that was preselected during operation in the third ratio as the power flow path from the torque input shaft 16 is interrupted. Torque thus is delivered from shaft 14 to headset gear 24, which is drivably connected to countershaft gear elements 34 and 46. Mainshaft gear 48 is drivably connected to countershaft gear 46. Gear 48 is connected drivably to mainshaft 28 through synchronizer clutch 92 since the sleeve 96 for the synchronizer clutch 92 was pre-engaged during operation in the third ratio. The range ratio remains unchanged as the ring gear 72 remains anchored to the transmission housing.

Prior to a shift to the fifth ratio in the high range, the clutch sleeve 82 of the synchronizer clutch assembly 84 is shifted in a right-hand direction in preparation for a subsequent shift to the fifth ratio. This causes engagement of the internal teeth of the sleeve 82 with external teeth 86 on the carrier 68. Internal sliding spline teeth on element 82' continuously engage and are fixed to external teeth on synchronizer clutch element 65. As this engagement occurs, gear 64 is not carrying torque.

During operation in the fifth ratio in the high range, engine torque delivered to input sleeve shaft 16 is transferred through the countershaft gearing to mainshaft gear 64, through internal spline teeth on element 82', through synchronizer sleeve 82 and through external synchronizer teeth 86 to the carrier 68. The synchronizer clutch sleeve 78 will move out of engagement with external clutch teeth on the transmission housing and into engagement with external clutch teeth on the synchronizer element 90 when desired to pre-select sixth ratio. Element 90 is splined, as shown, to the power output shaft 70. As the clutches for the headset gears are "traded," a torque flow path from headset gear 24 is interrupted and a torque flow path from headset gear 26 is established. This change occurs without torque interruption as a transition is made from low range to high range.

Figure 9:
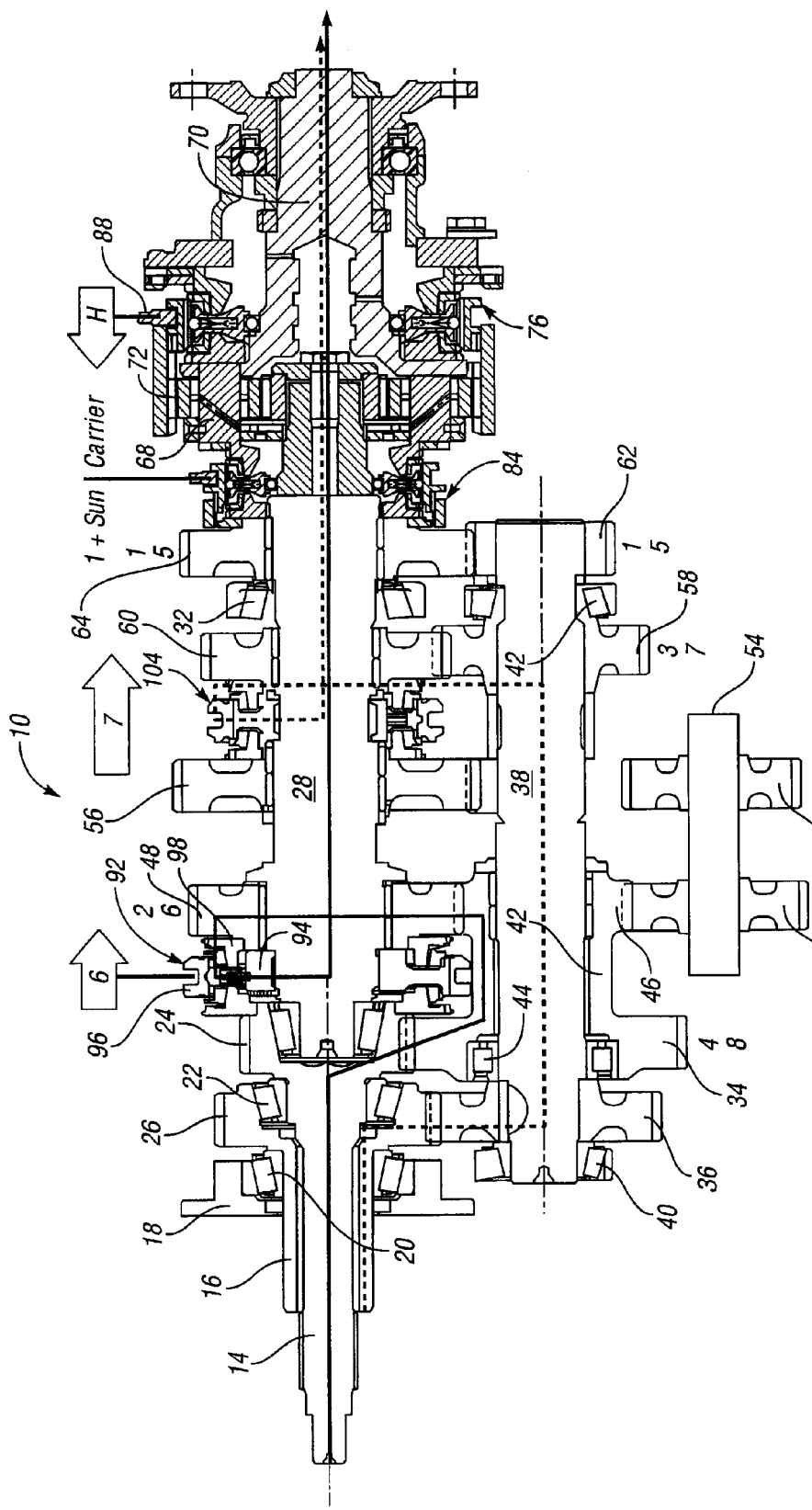
FIG. 9 is an illustration of the power flow path for the transmission of FIG. 1 during operation in the sixth ratio in the high range, together with a preselected power flow path for the seventh ratio.
Figure 10:
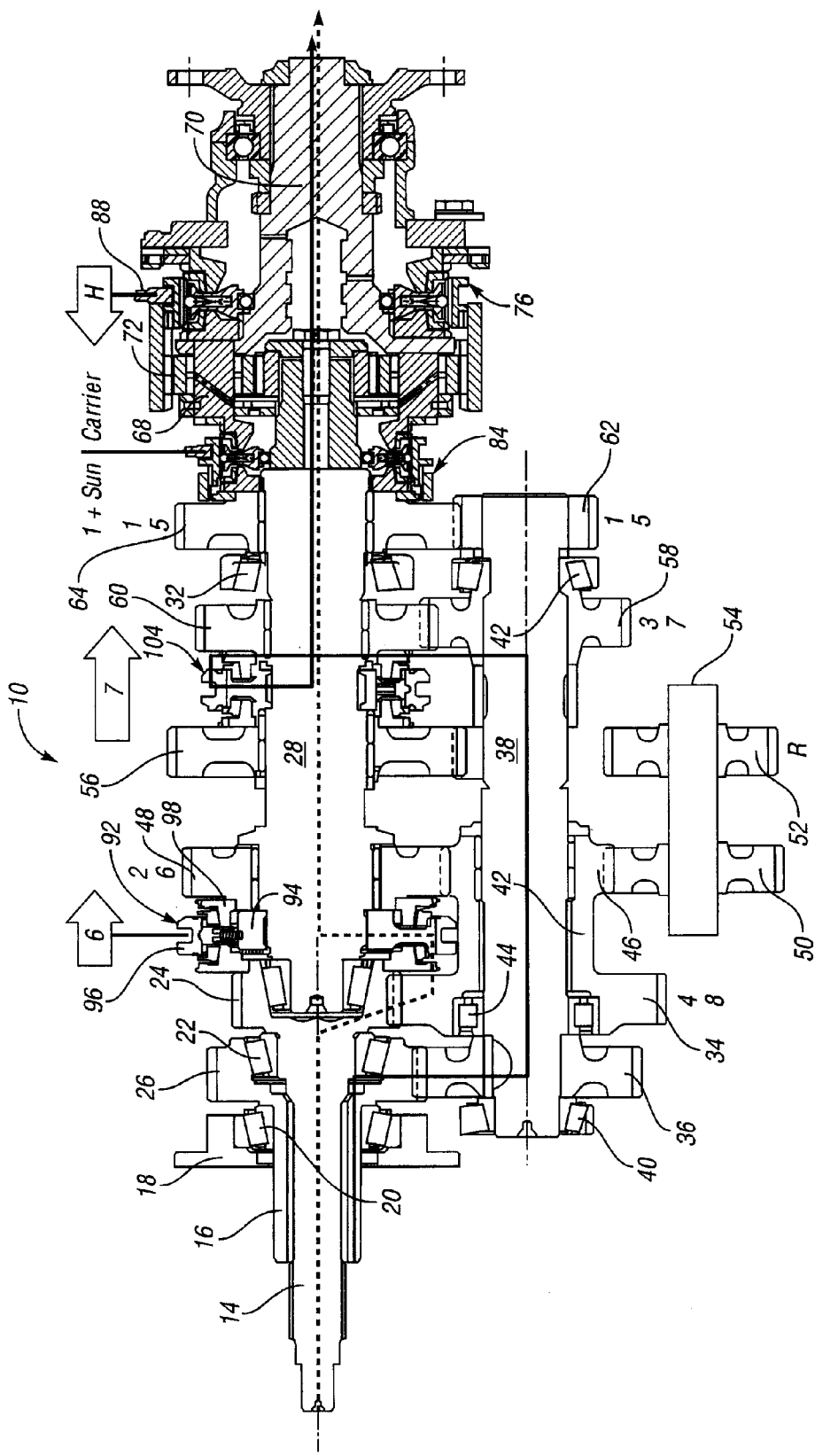
FIG. 10 is an illustration of the power flow path for the transmission of FIG. 1 during operation in the seventh ratio in the high range, together with a preselected power flow path for the eighth ratio.

During operation in the fifth ratio, which is the lowest ratio in the high range, the sixth ratio is preselected by shifting synchronizer clutch sleeve 96 to the right, which drivably connects mainshaft gear 48 to mainshaft 28, as seen in FIG. 9. Following a power shift of the clutches for the shaft 14 and the sleeve shaft 16, engine power during operation in the fifth ratio is delivered through headset gear 26, countershaft gear 58, mainshaft gear 60 and through synchronizer clutch 104 to the power output shaft 70. The power output shaft 70 is directly connected to the mainshaft 28 at this time since the planetary range gearing is locked up with the 1:1 ratio by the range clutch 76.

During operation in the sixth ratio, the seventh ratio is preselected under zero torque conditions by shifting synchronizer clutch 104 to the right, which directly connects gear 60 to the mainshaft 28. A power shift from the sixth ratio to the seventh ratio then is achieved by engaging and disengaging ("trading") the clutches for the input shafts 14 and 16. Power then is delivered through input shaft 16, through headset gear 26, through countershaft gear elements 36 and 58, through mainshaft gear 60 and then through the synchronizer clutch 104 to the mainshaft 28 and the power output shaft 70 as the planetary range gearing remains in the 1:1 ratio.

During operation in the seventh ratio, the eighth ratio is preselected by shifting synchronizer clutch sleeve 96 for the synchronizer clutch 92 in a left-hand direction to pre-condition the transmission for a direct connection between the shaft 14 and the mainshaft 28.

During reverse drive, the clutch for input shaft 14 is engaged so that headset gear 24 will drive countershaft gear element 34 and countershaft gear element 46. Reverse 52 is drivably connected to mainshaft gear 56 (the pinions 50 and 52 are shown out of position).

Figure 3:
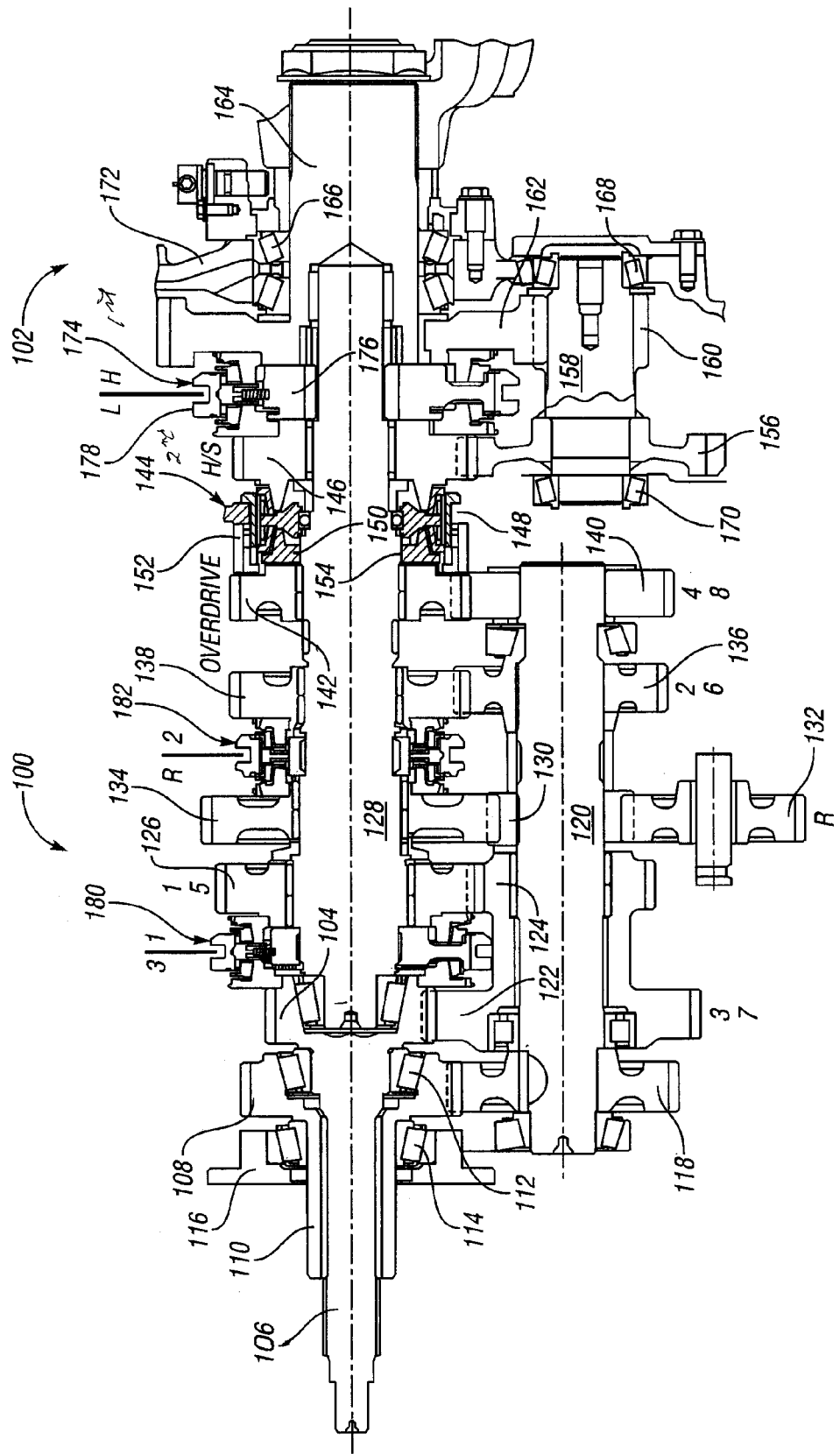
FIG. 3 is a partial cross-sectional view of a powertrain with a multiple-ratio, four-speed transmission in combination with a two-speed range gearing arrangement with countershaft gear elements.
Figure 4:
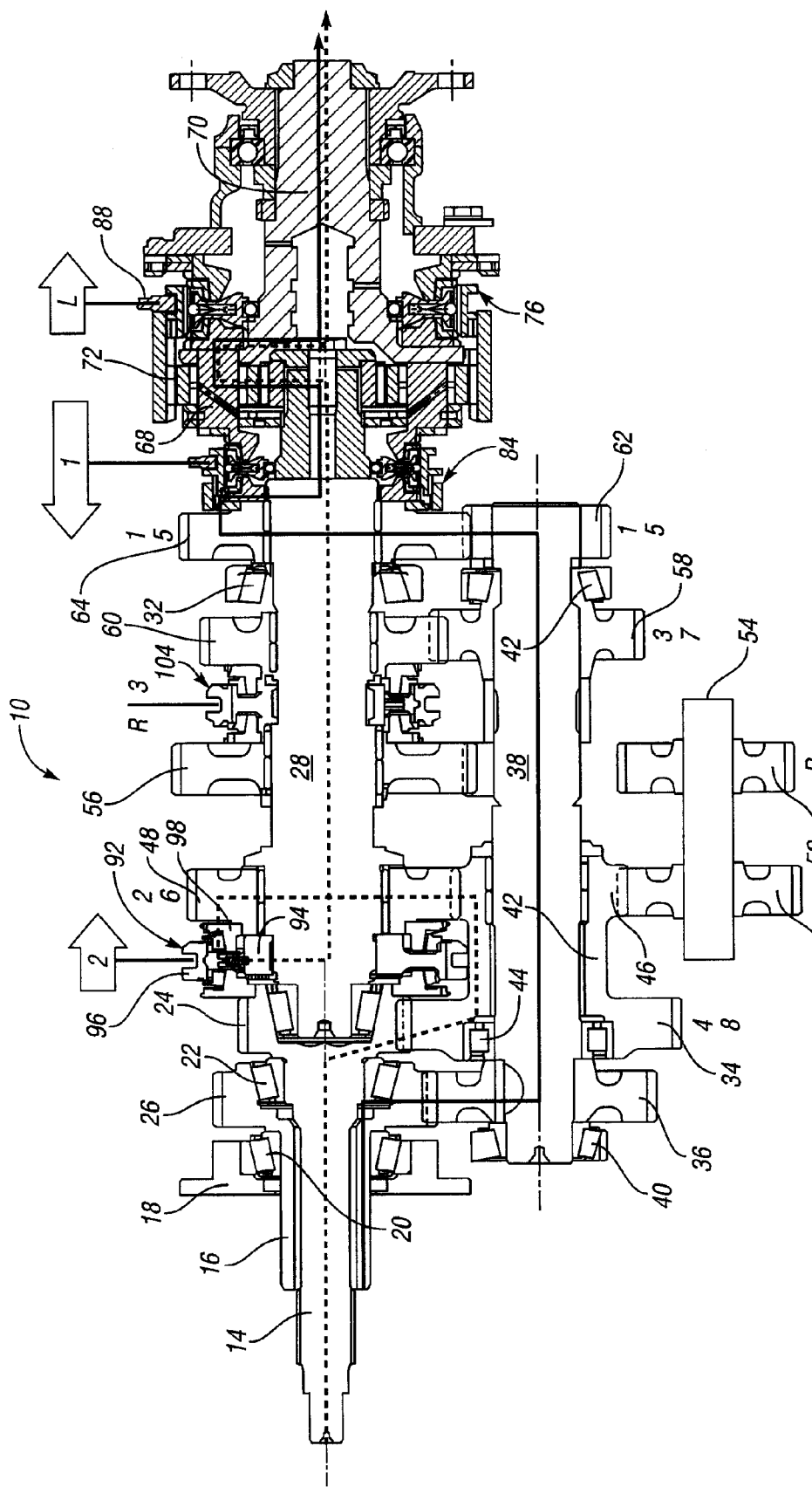
FIG. 4 is an illustration of the power flow path during operation of the transmission of FIG. 1 in the first gear ratio in the low range, together with a preselected power flow path for the second gear ratio.

A second embodiment of the invention, which is shown in FIG. 3, like the first embodiment of the invention shown in FIGS. 1, 1a and 3-10, is a four-speed ratio transmission, but a countershaft range gearing arrangement is used rather than a planetary range gearing arrangement. As in the case of the first embodiment, the transmission of the second embodiment has a pair of separate headset gears that are selectively connected through dual clutches to an engine, not shown. As in the case of the first embodiment, the second embodiment comprises a multiple speed transmission and a separate range gearing arrangement, wherein the range gearing arrangement is used to double the number of ratios available in the multiple speed transmission. The number of ratios available in the overall ratio range thus is eight ratios.

As in the case of the figures showing the first embodiment, a current power flow path for each ratio is illustrated in FIGS. 11-17 by a heavy solid line and a preselected power flow path is illustrated by a dotted line.

In FIG. 3, the four-speed dual clutch transmission is designated by reference numeral 100 and the countershaft range gearing is designated by numeral 102.

A first headset gear 104 is connected drivably to a first power input shaft 106. A second headset gear 108 is connected to second power input shaft 110, which is a sleeve shaft surrounding power input shaft 106. Bearings 112 and 114 journal the headset gears in a bearing cap 116 in the transmission housing, not shown.

A countershaft gear element 118, which is fixed to countershaft 120, engages headset gear 108. A countershaft gear element 122, which is journaled to countershaft 120, drivably engages headset gear 104. Gear element 122 is part of a countershaft sleeve assembly that includes countershaft gear element 124, which is in driving engagement with mainshaft gear 126. Gear 126 is journalled on mainshaft 128.

Reverse drive gear element 130 is secured to countershaft 120. It engages reverse drive pinion 132 mounted on a fixed reverse pinion countershaft. Reverse drive pinion 132 engages drivably reverse gear 134 journaled on mainshaft 128.

Countershaft gear element 136, which is fixed to countershaft 120, engages drivably gear 138, which is journaled on mainshaft 128.

Figure 1A:
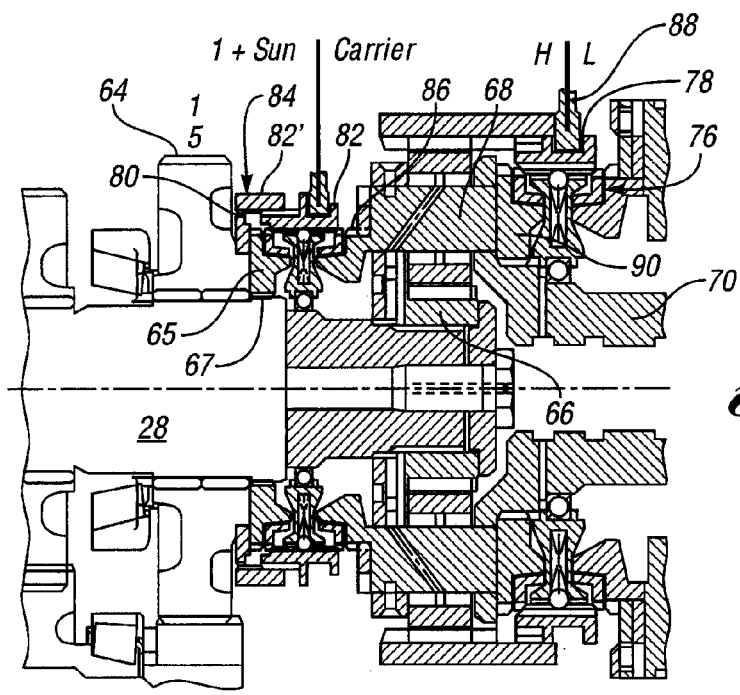
FIG. 1a is an enlarged view of the two-speed range planetary gearing illustrated in FIG. 1.

The countershaft gear 140 is fixed to countershaft 120. It drivably engages overdrive gear 142 journaled on mainshaft 128. A synchronizer clutch 144, which corresponds in function to the synchronizer clutch 84 of FIG. 1 and FIG. 1a, is situated between overdrive gear 142 and gear 146 of the countershaft range gearing 102. Gear 146 is journaled on mainshaft 128. It can be connected drivably to the mainshaft

128 when synchronizer clutch sleeve 148 is shifted in a right-hand direction so that internal clutch teeth on the clutch sleeve 148 engage external clutch teeth on the gear 146.

Clutch element 150 of the clutch 144 is splined or otherwise secured to mainshaft 128, as shown at 154. When the sleeve 148 is shifted in a left-hand direction, element 150 is connected directly to gear 142 as the sleeve 148 drivably engage external synchronizer clutch teeth on the element 150.

A splined sleeve element 152 has internal teeth that are in continuous engagement with external clutch teeth on the gear 142. External spline teeth are formed on the sleeve 148, which are in continuous sliding engagement with the internal teeth on the element 152.

When the sleeve 148 is shifted in a left-hand direction, external teeth on element 150 are engaged, thereby establishing a direct connection between gear 142 and the mainshaft 128. When sleeve 148 is shifted in a right-hand direction, the driving connection between gear 142 and mainshaft 128 is disconnected and gear 142 becomes connected to external clutch teeth on countershaft range gear 146. This establishes a direct connection between gear 142 and gear 146.

Gear 146 is in continuous meshing engagement with countershaft gear element 156. Countershaft gear element 156 is drivably connected to countershaft 158 on which is formed countershaft gear element 160. Countershaft range gearing output gear 162 is in driving engagement with gear element 160 so that torque delivered to gear 162 is transferred to power output shaft 164. A bearing assembly for supporting power output shaft is shown at 166. The countershaft 158 is end supported by bearings 168 and 170 in the countershaft range gearing housing, shown in part at 172.

A high/low synchronizer range gearing clutch, which corresponds to the clutch 76 shown in FIG. 1, is indicated in FIG. 3 at 174. A clutch hub 176 for the synchronizer range gearing clutch 174 is splined or otherwise secured to mainshaft 128. Clutch 174 includes a clutch sleeve 178 with internal splines that engage external clutch teeth of gear 162 when it is shifted in a right-hand direction, thus establishing a direct connection between mainshaft 128 and the output shaft 164. When the sleeve 178 is shifted in a left-hand direction, a direct mechanical connection is established between mainshaft 128 and gear 146 as clutch teeth on the gear 146 are drivably engaged by the internal splined teeth of the sleeve 178.

As in the case of the embodiment of the invention shown in FIG. 1 and FIG. 1a, the embodiment of FIG. 3 has four forward driving ratios in the transmission gearing 100. Further, the countershaft range gearing provides two ratio ranges so that the number of ratios in the overall powertrain is double the number of ratios available in the transmission 100. The ratio changes in each ratio range are achieved by power shifting the dual clutches for the two input shafts 106 and 110 so that as one of the dual clutches is disengaged the other is engaged, and vice versa. The ratio changes in the transmission 100 thus are achieved without torque interruption during the ratio change event. Further, a shift from one ratio range to the other in the countershaft range gearing 102 is achieved without torque interruption in the same fashion as the ratio changes in the range gearing are achieved in the embodiment of FIG. 1 and FIG. 1a.

A synchronizer clutch 180 is located between the gears 104 and 126 in FIG. 3. This synchronizer clutch corresponds to synchronizer clutch 92 in the embodiment of FIGS. 1 and 1a. A synchronizer clutch 182 is located between mainshaft gears 134 and 138 in FIG. 3. This synchronizer clutch corresponds to synchronizer clutch 104 in the embodiment of FIGS. 1 and 1a.

Figure 11:
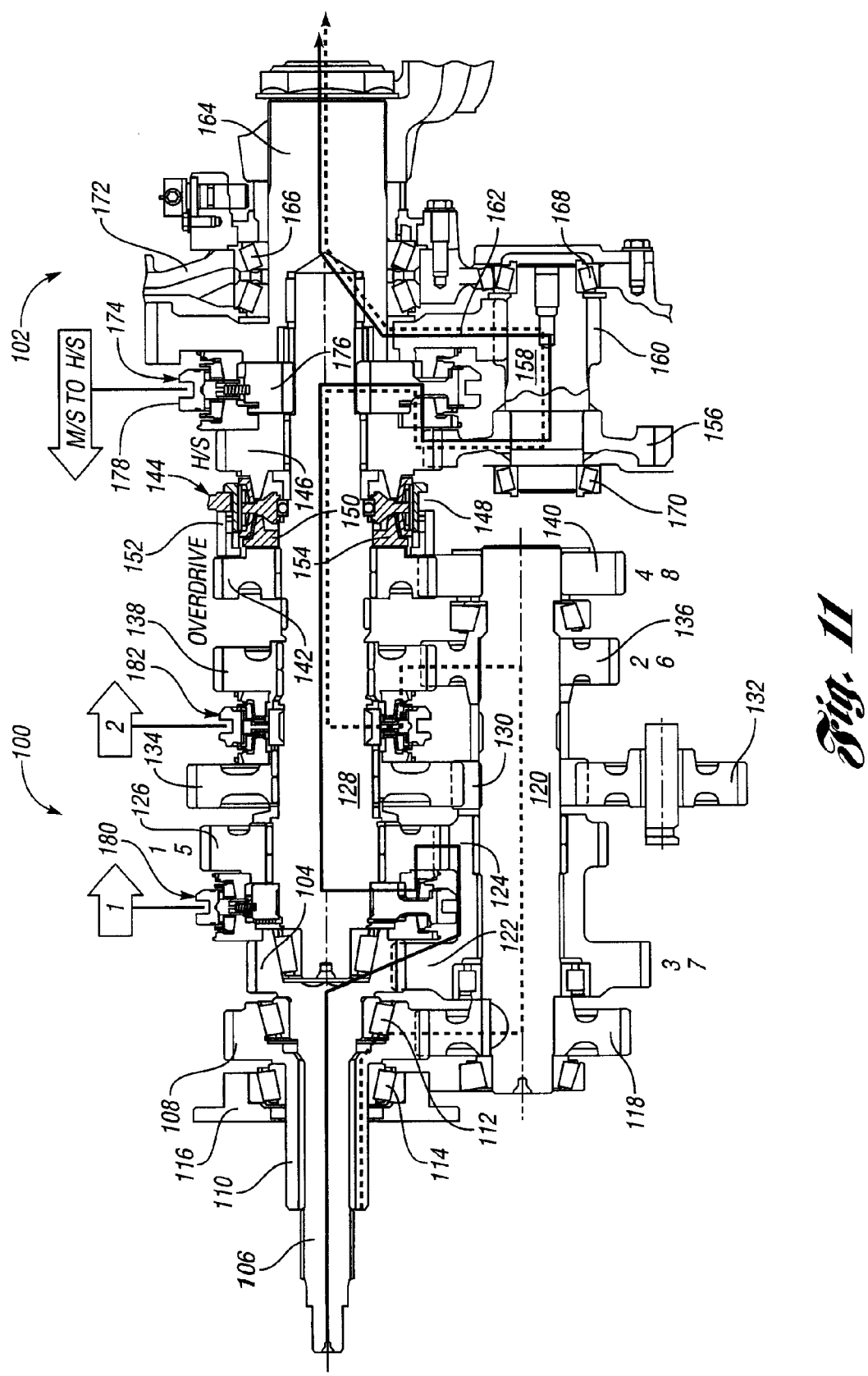
FIG. 11 is an illustration of the power flow path for the transmission of FIG. 3 during operation in the first ratio in the low range, together with a preselected power flow path for the second ratio.

FIG. 11 shows a power flow path through the transmission of FIG. 3 when the transmission is conditioned for the first driving ratio and the second preselected driving ratio in the low speed range. Synchronizer clutch 144 is centered in a neutral condition at this time. Torque is transmitted through shaft 106 to the headset gear 104. This drives countershaft gear element 122 and countershaft gear element 124.

Synchronizer clutch 180 is shifted to the right at this time, thereby connecting gear 126 to the mainshaft 128. A clutch sleeve for synchronizer clutch 174 is shifted to the left and engages external clutch teeth on mainshaft gear 146. Torque then is transmitted through gear 126 and through the mainshaft, through countershaft range clutch 174 and then to mainshaft gear 146. This drives countershaft range gear elements 156 and 160, thereby transferring torque to the output shaft 164 through gear 162. At this time, the second ratio in the low range is preselected. This is done by shifting a clutch sleeve for clutch 182 to the right, which connects gear 138 to the mainshaft. Countershaft gear element 136 then is conditioned to drive gear 138 and the mainshaft 128. The condition of the range gearing remains unchanged, so torque is delivered to the output shaft 164 from the mainshaft 128.

Figure 12:
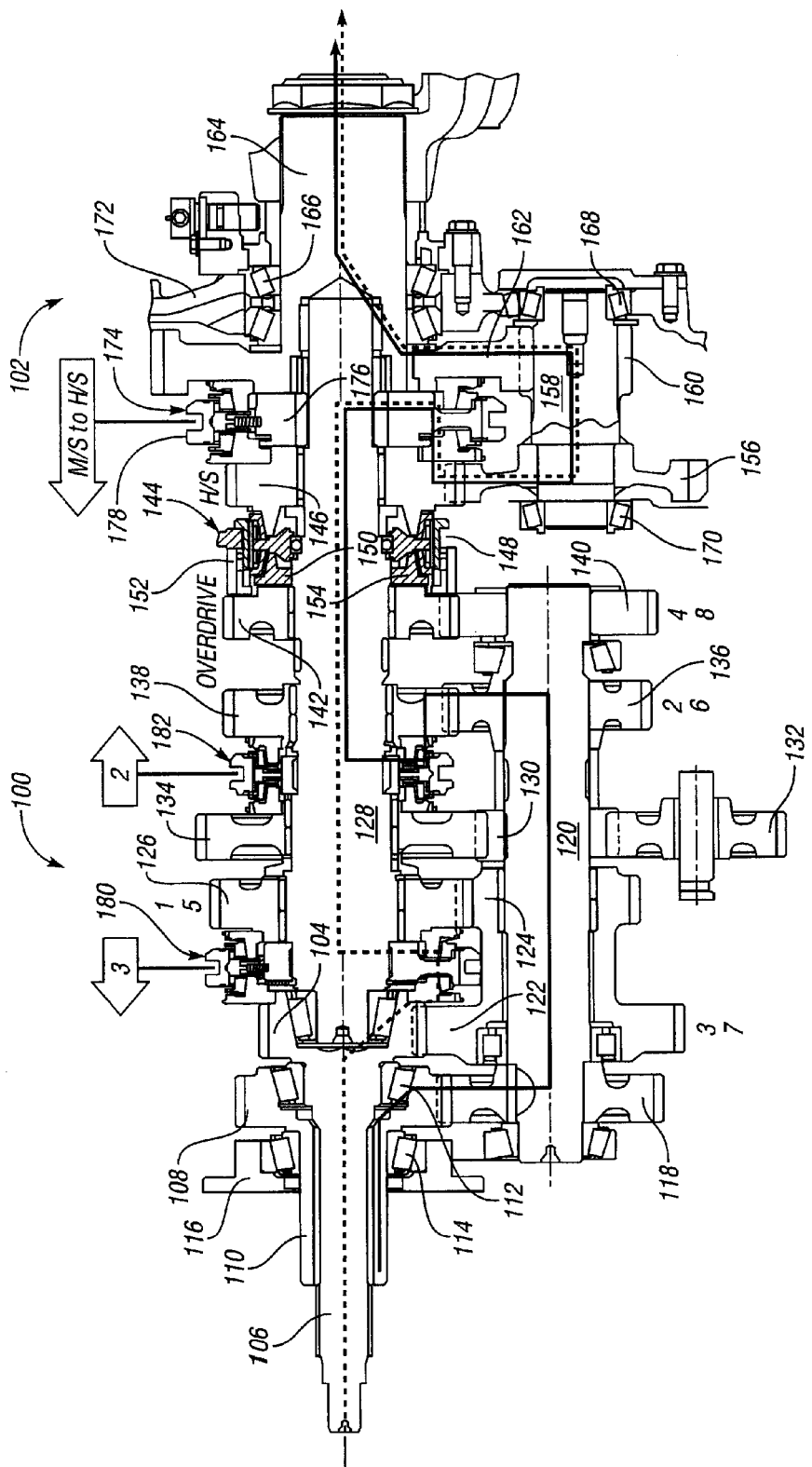
FIG. 12 is an illustration of the transmission of FIG. 3 showing the power flow path during operation in the second ratio in the low range, together with the preselected power flow path for the third ratio.

FIG. 12 shows a power flow path for second ratio in the low range, as well as a preselected power flow path for a third ratio. Again, synchronizer clutch 144 is in neutral. Power is delivered during second ratio operation from torque input shaft 110 to headset gear 108, which drives the countershaft gears 118 and 136. Synchronizer clutch 182 is shifted to the right, which connects gear 138 to the mainshaft 128. Power then is transferred through the countershaft range gearing, as previously described with reference to the first and second ratios.

Figure 13:
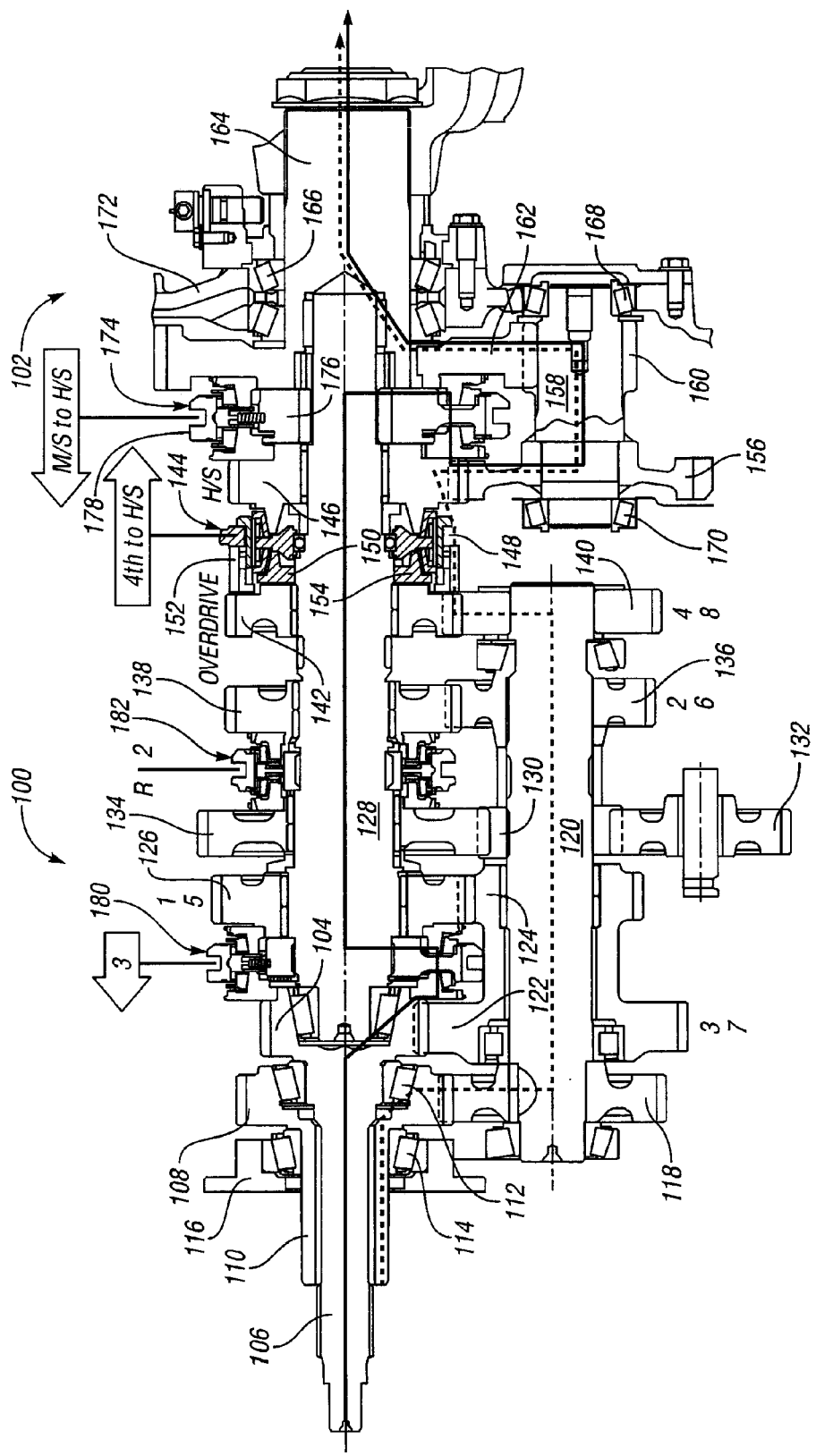
FIG. 13 is an illustration of the transmission of FIG. 3 showing the power flow path during operation in the third ratio in the low range, together with the preselected power flow path for the fourth ratio.

In the third ratio in the low speed range, as seen in FIG. 13, input shaft 106 now becomes connected to the engine through the dual clutch assembly and input shaft 110 becomes disconnected. Torque delivered to shaft 106 during operation in the third ratio is transferred to headset gear 104, which is directly connected to the mainshaft 128 through synchronizer clutch 180 as the sleeve for the synchronizer clutch 180 is shifted to the left. Torque then is delivered to the output shaft 164 following the same torque flow path through the range gearing previously described. The fourth ratio is preselected by shifting the synchronizer clutch 144 to the right, which connects gear 142 to the mainshaft.

Figure 14:
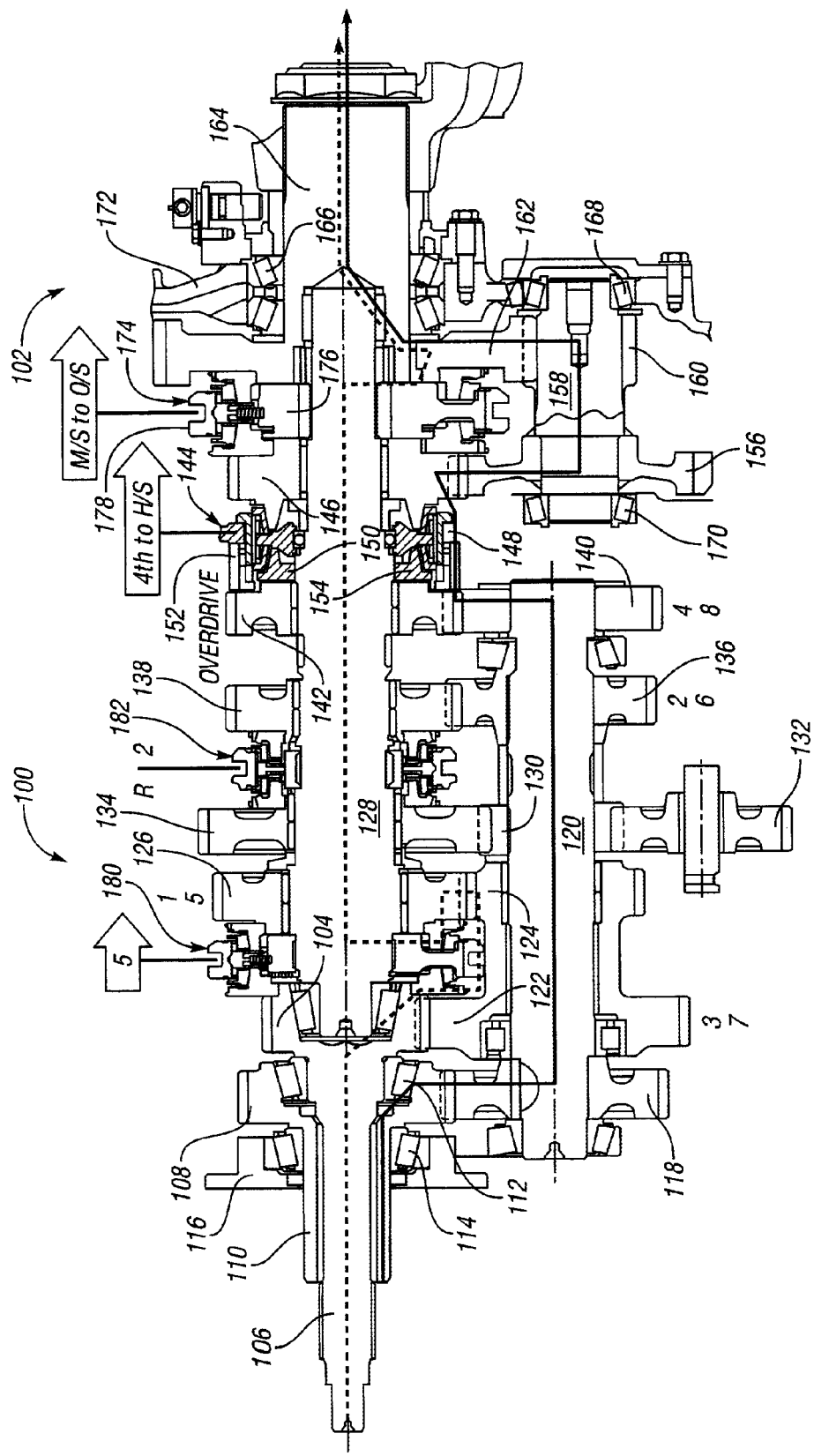
FIG. 14 is an illustration of the transmission of FIG. 3 showing the power flow path during operation in the fourth ratio in the low range, together with a preselected power flow path for the fifth ratio.

The power flow path for the fourth ratio in the low speed range is shown in FIG. 14. The dual clutches again are engaged and disengaged to "swap" torque input shafts. Torque input shaft 110 now is in the torque flow path. Thus, torque is delivered from gear 108 to countershaft gear element 118 and to countershaft 120. This drives countershaft gear element 140, which becomes connected through gear 142 and synchronizer clutch 144 to the mainshaft. Torque is then delivered to the output shaft through the same torque flow path in the range gearing previously described. The fifth ratio is preselected by shifting clutch 180 to the right, which connects mainshaft gear 126 to the mainshaft 128. The synchronizer clutch 174 is preconditioned for torque delivery in the fifth speed range by shifting the clutch sleeve 178 in the right-hand direction, thereby locking the mainshaft to the gear 162.

Figure 15:
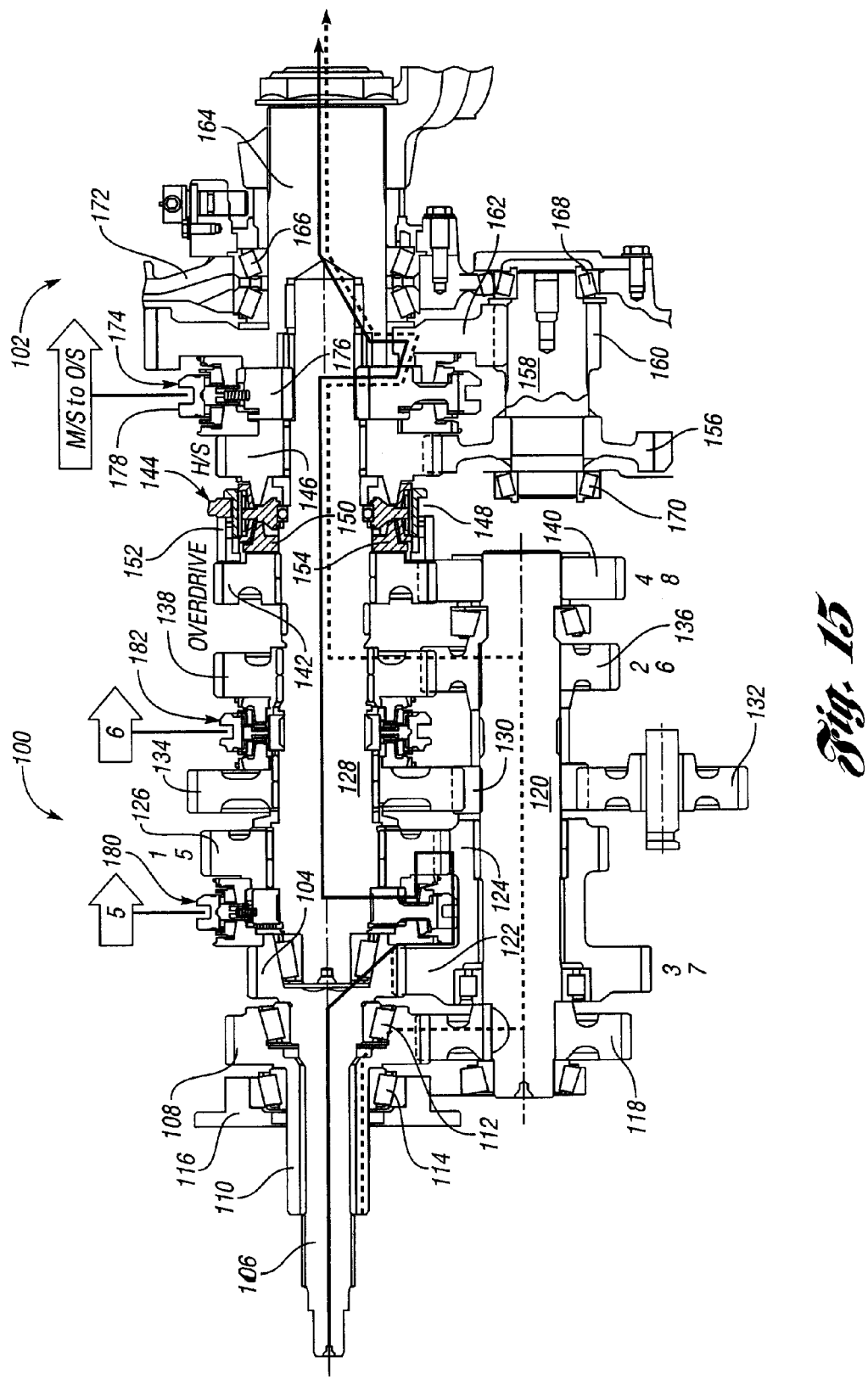
FIG. 15 is an illustration of the transmission of FIG. 3 showing the power flow path during operation in the fifth ratio in the high range.

The ratio change to the fifth ratio in high range from the fourth ratio in low range establishes a power flow path seen in FIG. 15. This is the lowest ratio in the high range. FIG. 15 also shows a preselected sixth ratio power flow path. When the clutch for input shaft 106 is engaged and the clutch for input shaft 110 is disengaged, torque is delivered to headset gear 108 and through countershaft gear elements 122 and 124, thereby driving gear 126. Synchronizer clutch 180, which was preselected, now connects gear 126 to the mainshaft. Synchronizer clutch 174, which was preselected during operation in the fourth ratio, is shifted to the right, thereby locking gear 162 to the mainshaft so torque is transferred from the mainshaft to the torque output shaft through the engaged clutch 174.

Figure 16:
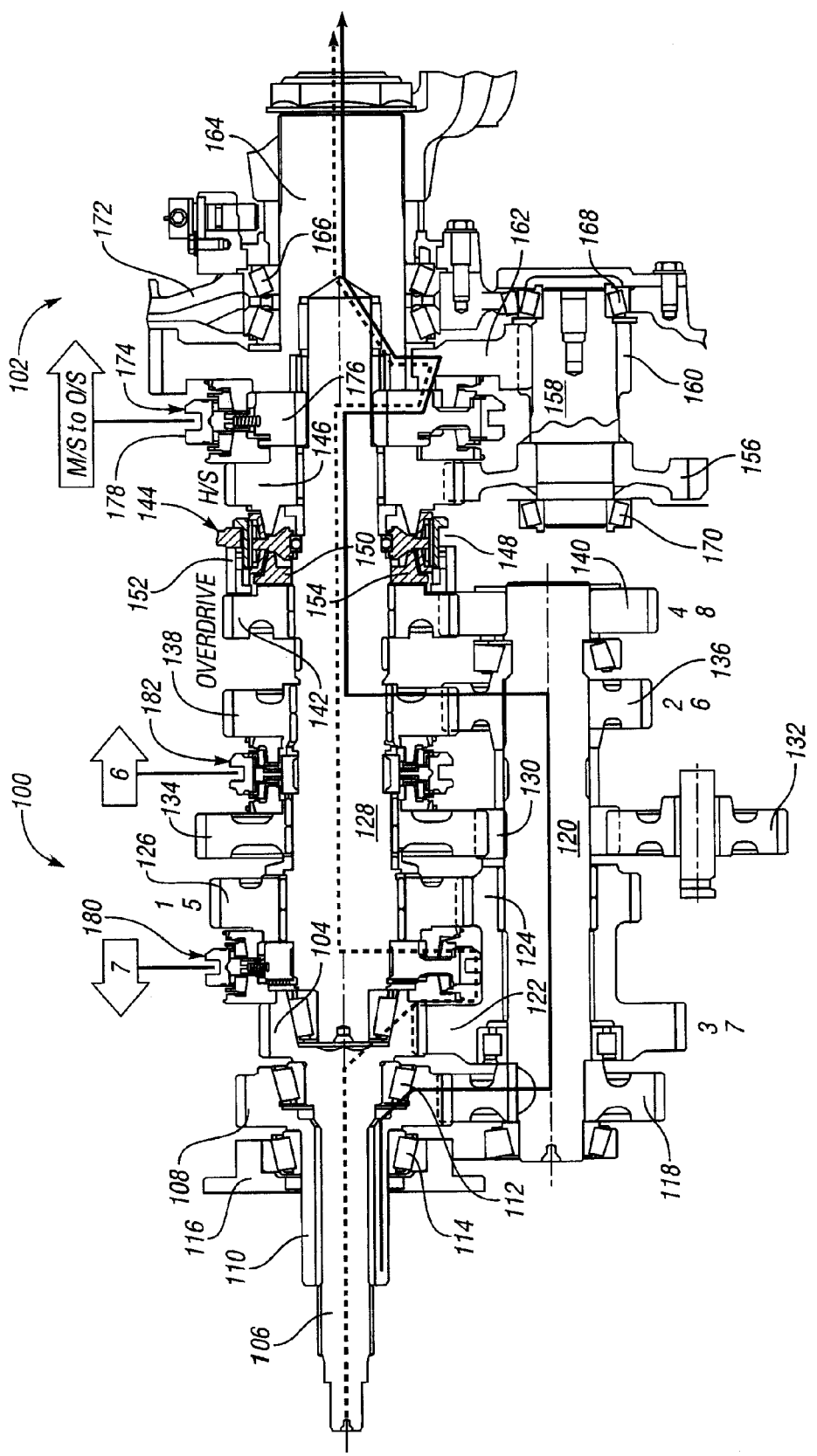
FIG. 16 is an illustration of the transmission of FIG. 3 showing the power flow path during operation in the sixth ratio in the high range.

Subsequent ratio changes in the high range take place by transitioning between ratios in the four-speed transmission as the torque flow path through the range gearing remains unchanged. During operation in the sixth ratio, as seen in FIG. 16, torque is delivered from shaft 110 to headset gear 108 and through countershaft gear elements 118 and 136 to mainshaft gear 138 as synchronizer clutch 182 is shifted to the right. At this time, the seventh ratio is preselected by shifting synchronizer clutch 180 in a left-hand direction, which locks the input shaft 106 to the mainshaft 128.

Figure 17:
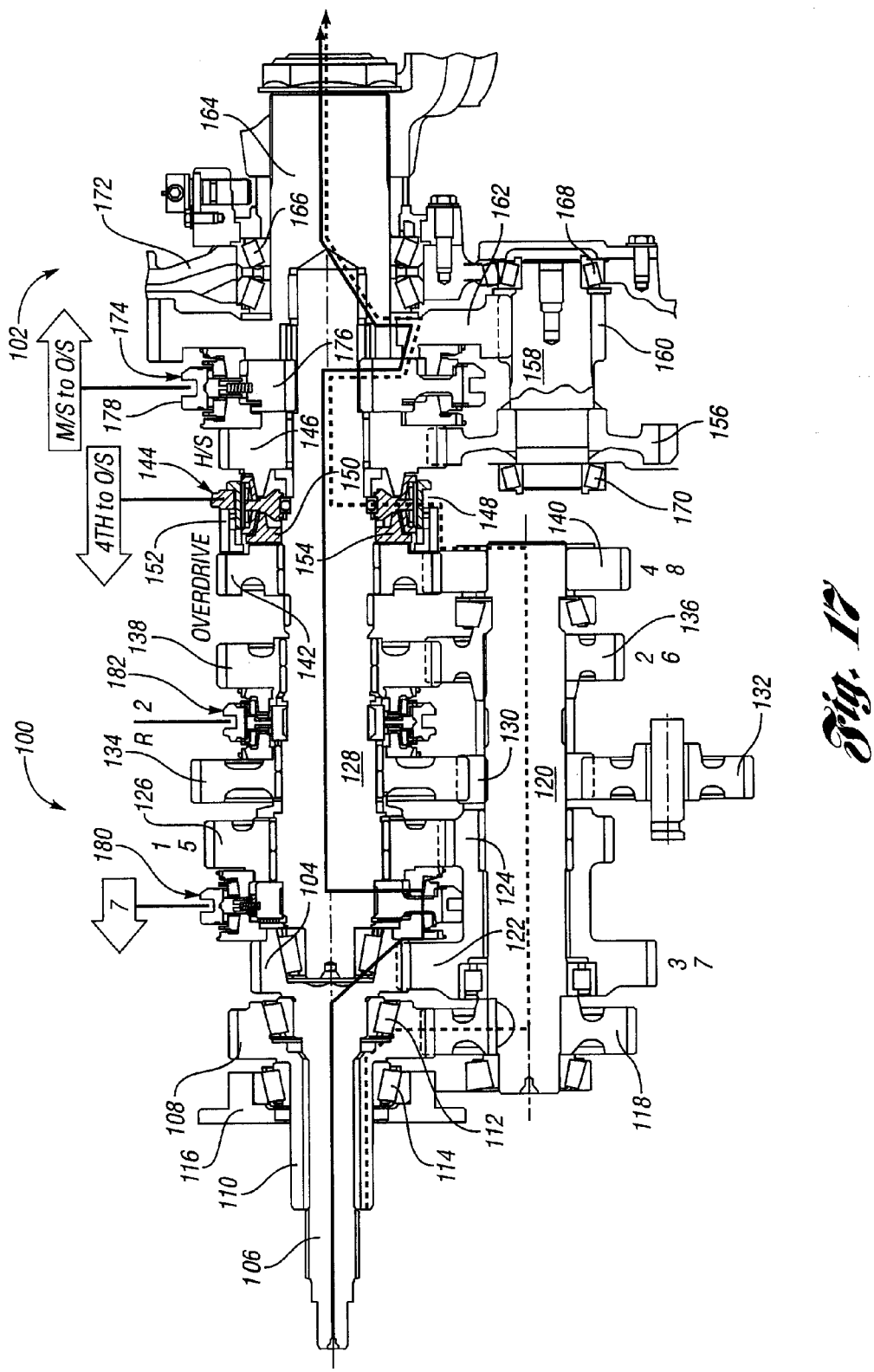
FIG. 17 is an illustration of the transmission of FIG. 3 showing the power flow path during operation in the seventh ratio in the high range.

The power flow path for operation in the seventh ratio in the high range is shown in FIG. 17. At this time, input shaft 106 is directly connected to the mainshaft through synchronizer clutch 180, as previously explained. The eighth ratio is preselected at this time by shifting synchronizer clutch 144 to the left, which locks the overdrive gear 142 to the mainshaft.

As in the case of the embodiment shown in FIGS. 1 and 1a, range shifts are made in the case of the embodiment of FIG. 3 without an undesirable interruption in torque delivery. Thus, a power shift can be made when shifting in the low range and in the high range merely by engaging and disengaging the dual clutches. A power shift from one range to the other, as well as a power shift in the transmission gearing, is made possible.

Each of the embodiments uses a four-speed transmission in combination with high/low range gearing. A transmission having a different number of ratios, however, could be used depending upon a design choice. Also, it is possible to use range gearing with more than two ranges. Further, other known synchronizer clutch constructions, including wet clutch pack designs, could be used. This would be particularly appropriate as a substitute for synchronizer clutch 88.

Embodiments of the invention have been disclosed, but it will be apparent to a person skilled in the art that modifications may be made without departing from the scope of the invention. All such modifications and equivalents thereof are intended to be covered by the following claims.

What is claimed is:

1. A multiple speed ratio power transmission mechanism for an engine powered vehicle having multiple gear ratio gearing, a mainshaft and range gearing with low and high ratio ranges;
   two separate countershaft assemblies including separate countershafts, and multiple mainshaft gears on the mainshaft, each countershaft assembly having at least one countershaft gear element engageable with separate mainshaft gears;
   two power input shafts;
   each power input shaft being drivably geared to a separate one of the countershaft assemblies;
   dual clutches for selectively establishing and disestablishing driving connections between an engine and each power input shaft; and
   gear ratio change clutches for selectively establishing torque flow paths through the multiple gear ratio gearing;
   one torque flow path from the engine to one countershaft assembly and through the multiple gear ratio gearing being established as another of the torque flow paths from the engine to the other countershaft assembly is preselected;
   the dual clutches disestablishing the one torque flow path and establishing the other torque flow path as the dual clutches are respectively engaged and disengaged;
   the range gearing including high and low range clutches for selectively establishing the low and high ratio ranges;
   the low ratio range being established and the high ratio range being preselected during torque delivery through the multiple gear ratio gearing;
   the low ratio range being disestablished and the high ratio range being established as the dual clutches are engaged and disengaged to condition the transmission mechanism for high range operation, the high and low range clutches being adapted to preselect high range operation during low range operation when torque delivery through range gearing for high ratio range operation is interrupted whereby a smooth transition from low ratio range operation to high ratio range operation is made during a change in torque delivery paths through the dual clutches.

2. A multiple speed ratio power transmission mechanism for an engine powered vehicle having multiple gear ratio gearing, a mainshaft and range gearing with low and high ratio ranges;
   two separate countershaft assemblies including separate countershafts, and multiple mainshaft gears on the mainshaft, each countershaft assembly having at least one countershaft gear element engageable with separate mainshaft gears;
   two power input shafts;
   each power input shaft being drivably geared to a separate one of the countershaft assemblies;
   dual clutches for selectively establishing and disestablishing driving connections between an engine and each power input shaft; and
   gear ratio change clutches for selectively establishing torque flow paths through the multiple gear ratio gearing;
   one torque flow path from the engine to one countershaft assembly and through the multiple gear ratio gearing being established as another of the torque flow paths from the engine to the other countershaft assembly is preselected;
   the dual clutches disestablishing the one torque flow path and establishing the other torque flow path as the dual clutches are respectively engaged and disengaged;
   the range gearing including high and low range clutches for selectively establishing the low and high ratio ranges;
   the low ratio range being established and the high ratio range being preselected during torque delivery through the multiple gear ratio gearing;
   the low ratio range being disestablished and the high ratio range being established as the dual clutches are engaged and disengaged to condition the transmission mechanism for high range operation, the lowest gear ratio in the high ratio range being established and highest gear ratio in the low ratio range being disestablished when the torque flow paths through the dual clutches are changed.

3. A multiple speed ratio power transmission mechanism for an engine powered vehicle having multiple gear ratio gearing, a mainshaft and range gearing with low and high ratio ranges;
   multiple mainshaft gears on the mainshaft and two separate countershaft assemblies in torque flow paths from a torque input shaft assembly;

the mainshaft gears on the mainshaft and countershaft gear elements on each countershaft assembly being in driving engagement;

two power input clutches for separately establishing an engine power flow path to each of the countershaft assemblies;

gear ratio change clutches for selectively connecting the mainshaft gears to the mainshaft;

range gearing comprising a planetary gear unit having a sun gear connected to the mainshaft, a carrier connected to a torque output shaft and a ring gear;

a low range clutch for selectively braking the ring gear; and a high range clutch for selectively locking together two elements of the planetary gear unit;

one gear ratio change clutch being adapted to selectively connect a mainshaft gear to the carrier during high ratio range operation and to connect the mainshaft gear to the sun gear during low ratio range operation.

4. The transmission mechanism set forth in claim 3 wherein the dual clutches are selectively engageable to effect a transition from operation in low ratio range to operation in high ratio range without torque delivery interruption.

5. The multiple speed ratio transmission set forth in claim 4 wherein the one mainshaft gear is selectively connected to the mainshaft in a torque delivery path during operation in highest gear ratio in the low ratio range and lowest gear ratio in the high ratio range as the dual clutches are engaged and disengaged.

6. The transmission mechanism set forth in claim 3 wherein operation in lowest gear ratio in the high ratio range is preselected during operation in highest gear ratio in the low ratio range, a power shift from the low ratio range to the high ratio range being effected when torque delivery paths through the dual clutches are exchanged.

* * * * *